US006868491B1

(12) United States Patent
Moore

(10) Patent No.: US 6,868,491 B1
(45) Date of Patent: *Mar. 15, 2005

(54) PROCESSOR AND METHOD OF EXECUTING LOAD INSTRUCTIONS OUT-OF-ORDER HAVING REDUCED HAZARD PENALTY

(75) Inventor: Charles Robert Moore, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 645 days.

This patent is subject to a terminal disclaimer.

(21) Appl. No.: 09/598,434

(22) Filed: Jun. 22, 2000

(51) Int. Cl.[7] .............................................. G06F 9/312
(52) U.S. Cl. ..................................... 712/225; 712/216
(58) Field of Search ................................ 712/225, 216, 712/23, 219; 714/30

(56) References Cited

U.S. PATENT DOCUMENTS

| 5,664,215 A | 9/1997 | Burgess et al. |
| 5,694,568 A | 12/1997 | Harrison, III et al. |
| 5,706,464 A | 1/1998 | Moore et al. |
| 5,742,785 A | 4/1998 | Stone et al. |
| 5,778,245 A | 7/1998 | Papworth et al. |
| 5,951,670 A * | 9/1999 | Glew et al. ................... 712/23 |
| 6,009,539 A * | 12/1999 | Ranson ........................ 714/30 |
| 6,301,654 B1 * | 10/2001 | Ronchetti et al. ........... 712/225 |
| 6,349,382 B1 * | 2/2002 | Feiste et al. ................ 712/216 |
| 6,360,314 B1 * | 3/2002 | Webb, Jr. et al. ........... 712/219 |
| 6,370,625 B1 | 4/2002 | Carmean et al. |
| 6,553,480 B1 * | 4/2003 | Cheong et al. ............... 712/23 |
| 6,622,235 B1 * | 9/2003 | Keller et al. ................. 712/23 |
| 6,725,358 B1 * | 4/2004 | Moore ........................ 712/216 |

* cited by examiner

Primary Examiner—John Follansbee
Assistant Examiner—Jungwon Chang
(74) Attorney, Agent, or Firm—Volel Emile; Mark S. Walker; Dillon & Yudell LLP

(57) ABSTRACT

A processor having a reduced data hazard penalty includes a register set, at least one execution unit that executes load instructions to transfer data into the register set, and a load queue. The load queue contains at least one entry, and each occupied entry in the load queue stores load data retrieved by an executed load instruction in association with a target address of the executed load instruction. The load queue has associated queue management logic that, in response to execution by the execution unit of a load instruction, determines by reference to the load queue whether a data hazard exists for the load instruction. If so, the queue management logic outputs load data from the load queue to the register set in accordance with the load instruction, thus eliminating the need to flush and re-execute the load instruction.

18 Claims, 5 Drawing Sheets

PROCESSOR AND METHOD OF EXECUTING LOAD INSTRUCTIONS OUT-OF-ORDER HAVING REDUCED HAZARD PENALTY

BACKGROUND OF THE INVENTION

1. Technical Field

The present invention relates in general to data processing and, in particular, to the execution of load instructions by a processor. Still more particularly, the present invention relates to a processor that buffers load data for out-of-order load instructions in order to reduce the performance penalty associated with data hazards.

2. Description of the Related Art

A typical superscalar processor can comprise, for example, an instruction cache for storing instructions, one or more execution units for executing sequential instructions, a branch unit for executing branch instructions, instruction sequencing logic for routing instructions to the various execution units, and registers for storing operands and result data. In order to leverage the parallel execution capabilities of these multiple execution units, some superscalar processors support out-of-order execution, that is, the execution of instructions in a different order than the programmed sequence.

When executing instructions out-of-order, it is essential for correctness that the processor produce the same execution results that would have been produced had the instructions been executed in the programmed sequence. For example, given the following sequence of instructions:

LOAD1
ADD
STORE
...
LOAD2 where LOAD1 and LOAD2 target the same address and LOAD1 precedes LOAD2 in program order, LOAD2 cannot be permitted to receive older data than LOAD1. However, if LOAD2 is executed prior to (i.e., out-of-order with respect to) LOAD1, LOAD2 may receive older data than LOAD1 if the intervening STORE is targeted at the same address or if another processor within the same computer system stores to the same address. A scenario in which an out-of-order executed load instruction receives incorrect data is defined herein to be a data hazard.

Superscalar processors that support out-of-order execution of load instructions typically detect and correct for data hazards by implementing a load queue that stores the target address of each load instruction that was executed out-of-order. Following execution of the out-of-order load instruction, addresses of exclusive transaction (e.g., read-with-intent-to-modify or kill) driven on the computer system interconnect by other processors, as well as store instructions preceding the load instruction that are initiated by the processor itself, are snooped against the entries within the load queue. If a snooped exclusive transaction or a local store operation hits within the load queue, the entry is marked, for example, by setting a flag.

Thereafter, when the processor executes a load instruction, the processor determines whether or not the load instruction precedes the out-of-order load instruction in program order and whether or not the subsequently executed load instruction targets an address specified in a marked entry in the load queue. If so, a data hazard is detected, and the processor flushes and re-executes at least both load instructions, and possibly all instructions in flight following the first of the two load instruction in program order. Flushing and re-executing instructions in this manner to remedy data hazards results in a significant performance penalty, particularly for processors having wide instruction execution windows.

SUMMARY OF THE INVENTION

The present invention reduces the performance penalty associated with data hazards resulting from the out-of-order execution of load instructions by implementing an improved load queue within a processor.

In accordance with the present invention, a processor having a reduced data hazard penalty includes a register set, at least one execution unit that executes load instructions to transfer data into the register set, and a load queue. The load queue contains at least one entry, and each occupied entry in the load queue stores load data retrieved by an executed load instruction in association with a target address of the executed load instruction. The load queue has associated queue management logic that, in response to execution by the execution unit of a load instruction, determines by reference to the load queue whether a data hazard exists for the load instruction. If so, the queue management logic outputs load data from the load queue to the register set in accordance with the load instruction, thus eliminating the need to flush and re-execute the load instruction.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
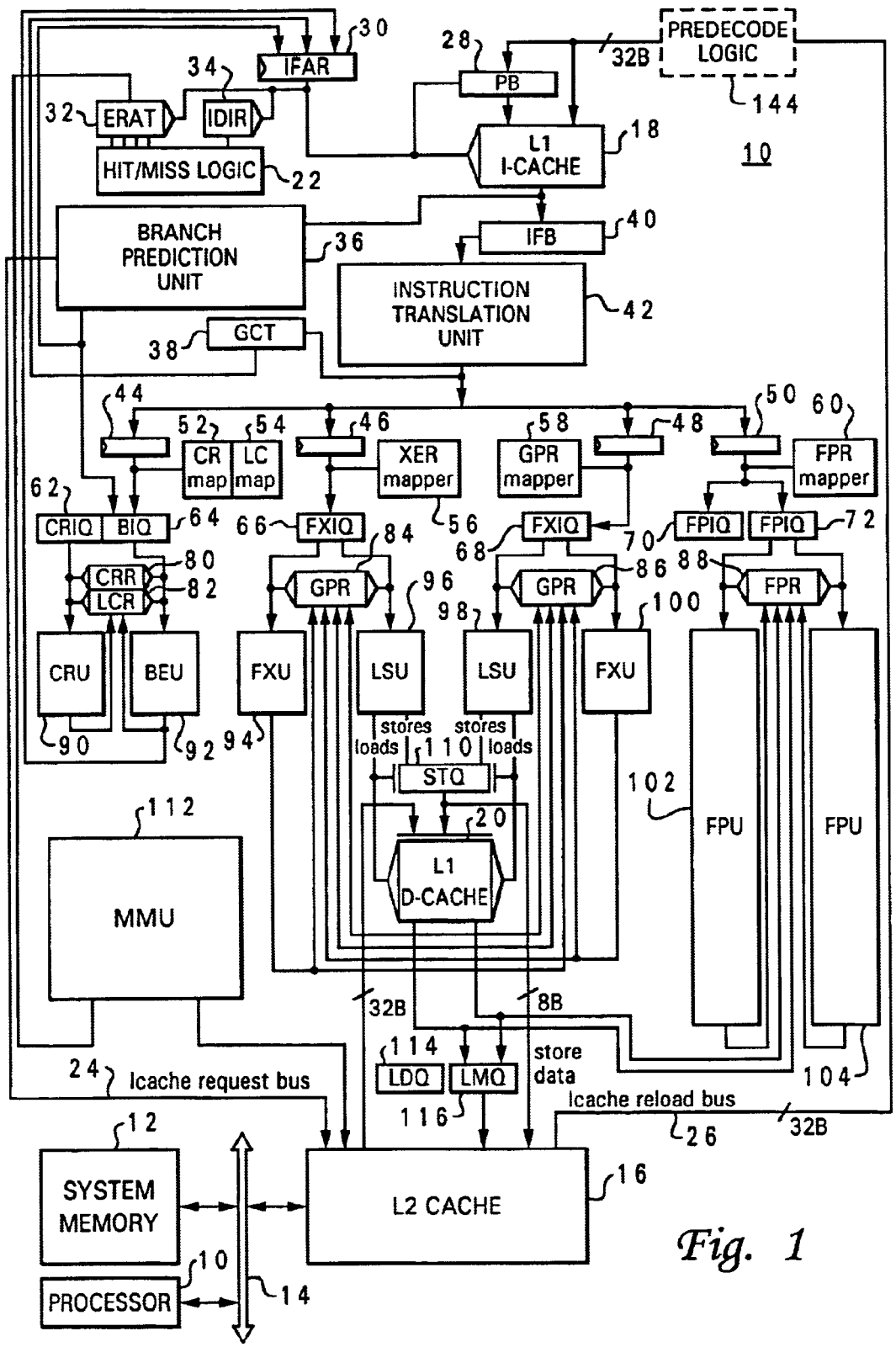
FIG. 1 depicts an illustrative embodiment of a data processing system with which the method and system of the present invention may advantageously be utilized.

With reference now to the figures and in particular with reference to FIG. 1, there is depicted a high level block diagram of an illustrative embodiment of a processor, indicated generally at 10, for processing instructions and data in accordance with the present invention. In particular, processor 10 reduces data hazard penalties by implementing a load data queue that buffers load data associated with out-of-order load instructions.

Processors 10 comprises a single integrated circuit superscalar processor, which as discussed further below, includes various execution units, registers, buffers, memories, and other functional units that are all formed by integrated circuitry. As illustrated in FIG. 1, processor 10 may be coupled to other devices, such as a system memory 12 and a second processor 10, by an interconnect fabric 14 to form a larger data processing system such as a workstation computer system. Processor 10 also includes an on-chip multi-level cache hierarchy including a unified level two (L2) cache 16 and bifurcated level one (L1) instruction (I) and data (D) caches 18 and 20, respectively. As is well-known to those skilled in the art, caches 16, 18 and 20 provide low latency access to cache lines corresponding to memory locations in system memory 12.

Instructions are fetched for processing from L1 I-cache 18 in response to the effective address (EA) residing in instruction fetch address register (IFAR) 30. During each cycle, a new instruction fetch address may be loaded into IFAR 30 from one of three sources: branch prediction unit (BPU) 36, which provides speculative target path addresses resulting from the prediction of conditional branch instructions, global completion table (GCT) 38, which provides sequential path addresses, and branch execution unit (BEU) 92, which provides non-speculative addresses resulting from the resolution of predicted conditional branch instructions. If hit/miss logic 22 determines, after translation of the EA contained in IFAR 30 by effective-to-real address translation (ERAT) 32 and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 based upon recent access patterns. In response to a request address, L2 cache 16 outputs a cache line of instructions, which are loaded into prefetch buffer (PB) 28 and L1 I-cache 18 via I-cache reload bus 26, possibly after passing through optional predecode logic 144.

Once the cache line specified by the EA in IFAR 30 resides in L1 cache 18, L1 I-cache 18 outputs the cache line to both branch prediction unit (BPU) 36 and to instruction fetch buffer (IFB) 40. BPU 36 scans the cache line of instructions for branch instructions and predicts the outcome of conditional branch instructions, if any. Following a branch prediction, BPU 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the cache line of instructions received from L1 I-cache 18 until the cache line of instructions can be translated by instruction translation unit (ITU) 42. In the illustrated embodiment of processor 10, ITU 42 translates instructions from user instruction set architecture (UISA) instructions into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 38 to an instruction group, the members of which are permitted to be executed out-of-order with respect to one another. Global completion table 38 tracks each instruction group for which execution has yet to be completed by at least one associated EA, which is preferably the EA of the oldest instruction in the instruction group.

Following UISA-to-IISA instruction translation, instructions are dispatched in-order to one of latches 44, 46, 48 and 50 according to instruction type. That is, branch instructions and other condition register (CR) modifying instructions are dispatched to latch 44, fixed-point and load-store instructions are dispatched to either of latches 46 and 48, and floating-point instructions are dispatched to latch 50. Each instruction requiring a rename register for temporarily storing execution results is then assigned one or more rename registers by the appropriate one of CR mapper 52, link and count (LC) register mapper 54, exception register (XER) mapper 56, general-purpose register (GPR) mapper 58, and floating-point register (FPR) mapper 60.

The dispatched instructions are then temporarily placed in an appropriate one of CR issue queue (CRIQ) 62, branch issue queue (BIQ) 64, fixed-point issue queues (FXIQs) 66 and 68, and floating-point issue queues (FPIQs) 70 and 72. From issue queues 62, 64, 66, 68, 70 and 72, instructions can be issued opportunistically (i.e., possibly out-of-order) to the execution units of processor 10 for execution. The instructions, however, are maintained in issue queues 62–72 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, and two floating-point units (FPUs) 102 and 104 for executing floating-point instructions. Each of execution units 90–104 is preferably implemented as an execution pipeline having a number of pipeline stages.

During execution within one of execution units 90–104, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution notifies GCT 38, which schedules completion of instructions in program order. To complete an instruction executed by one of CRU 90, FXUs 94 and 100 or FPUs 102 and 104, GCT 38 signals the execution unit, which writes back the result data, if any, from the assigned rename register(s) to one or more architected registers within the appropriate register file. The instruction is then removed from the issue queue, and once all instructions within its instruction group have completed, is removed from GCT 38. Other types of instructions however, are completed differently.

When BEU 92 resolves a conditional branch instruction and determines the path address of the execution path that should be taken, the path address is compared against the speculative path address predicted by BPU 36. If the path addresses match, no further processing is required. If, however, the calculated path address does not match the predicted path address, BEU 92 supplies the correct path address to IFAR 30. In either event, the branch instruction can then be removed from BIQ 64, and when all other instructions within the same instruction group have completed, from GCT 38.

Following execution of a load instruction, the effective address computed by executing the load instruction is translated to a real address by a data ERAT (not illustrated) and then provided to L1 D-cache 20 as a request address. At this point, the load operation is removed from FXIQ 66 or 68 and placed in load data queue (LDQ) 114 until the indicated load is performed. If the request address misses in L1 D-cache 20, the request address is placed in load miss queue (LMQ) 116, from which the requested data is retrieved from L2 cache 16, and failing that, from another processor 10 or from system memory 12. As described in detail below, LDQ 114 ensures that data hazards are detected and appropriate remedial action is taken such that the later of two load instructions targeting the same address does not receive older data than the earlier of the two load instructions. Store instructions are similarly completed utilizing a store queue (STQ) 110 into which effective addresses for stores are loaded following execution of the store instructions. From STQ 110, data can be stored into either or both of L1 D-cache 20 and L2 cache 16.

Figure 2:
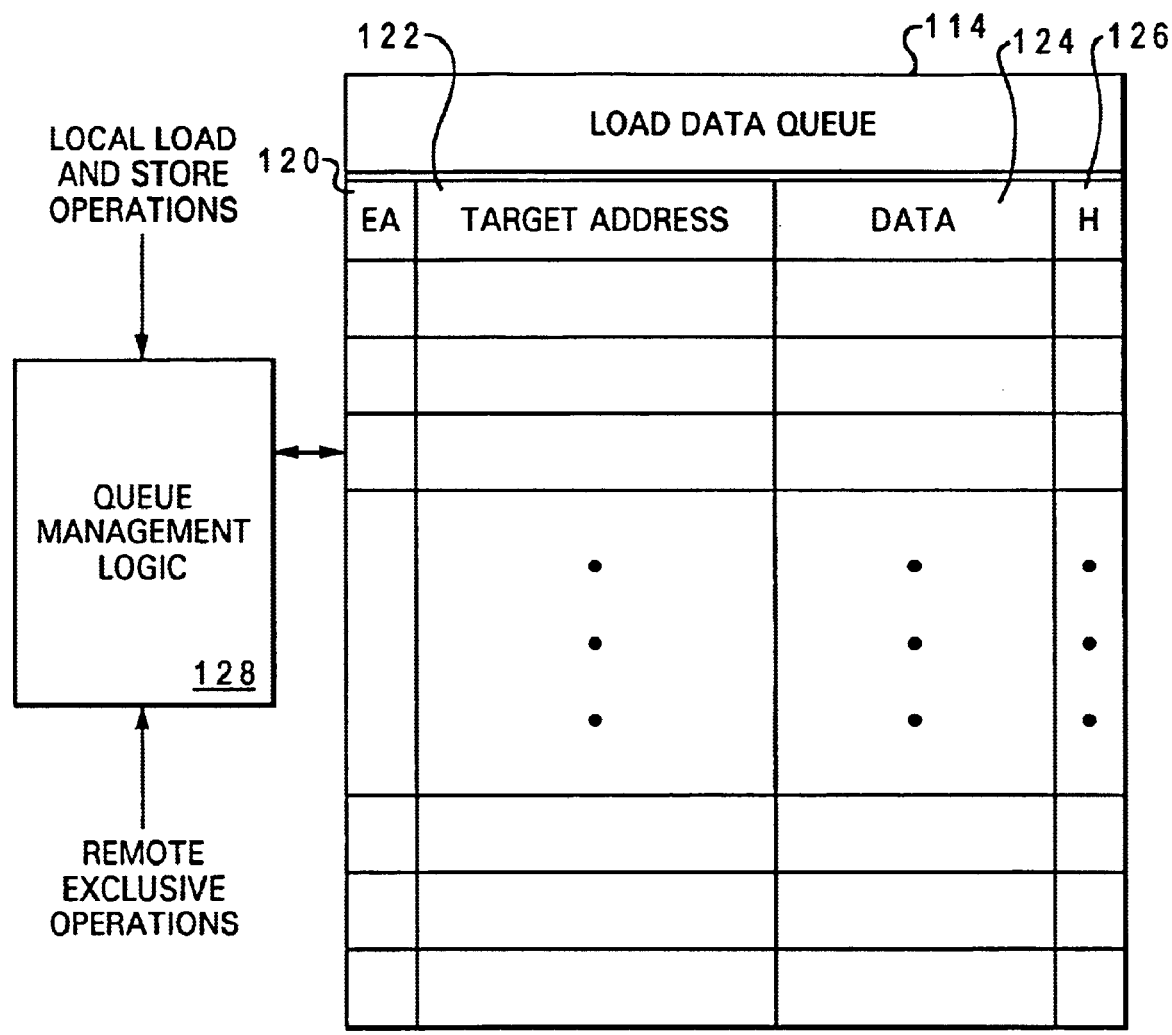
FIG. 2 is a block diagram of an exemplary embodiment of the load data queue (LDQ) illustrated in FIG. 1.

Referring now to FIG. 2, there is depicted an exemplary embodiment of LDQ 114 of processor 10. As illustrated, LDQ 114 includes a number of entries, each including a effective address (EA) field 120 for storing the effective address (of address tag portion thereof) of a load instruction, a target address field 122 for storing the target address (or address tag portion thereof) from which the load instruction obtains data, a data field 124 for storing data loaded from memory by a load instruction, and a hazard field 126 for indicating that a hazard may exist for a load instruction. Entries within LDQ 114 are preferably allocated, updated, and deallocated by associated queue management logic 128 in accordance with the processes depicted in FIGS. 3A and 3B.

Figure 3A:
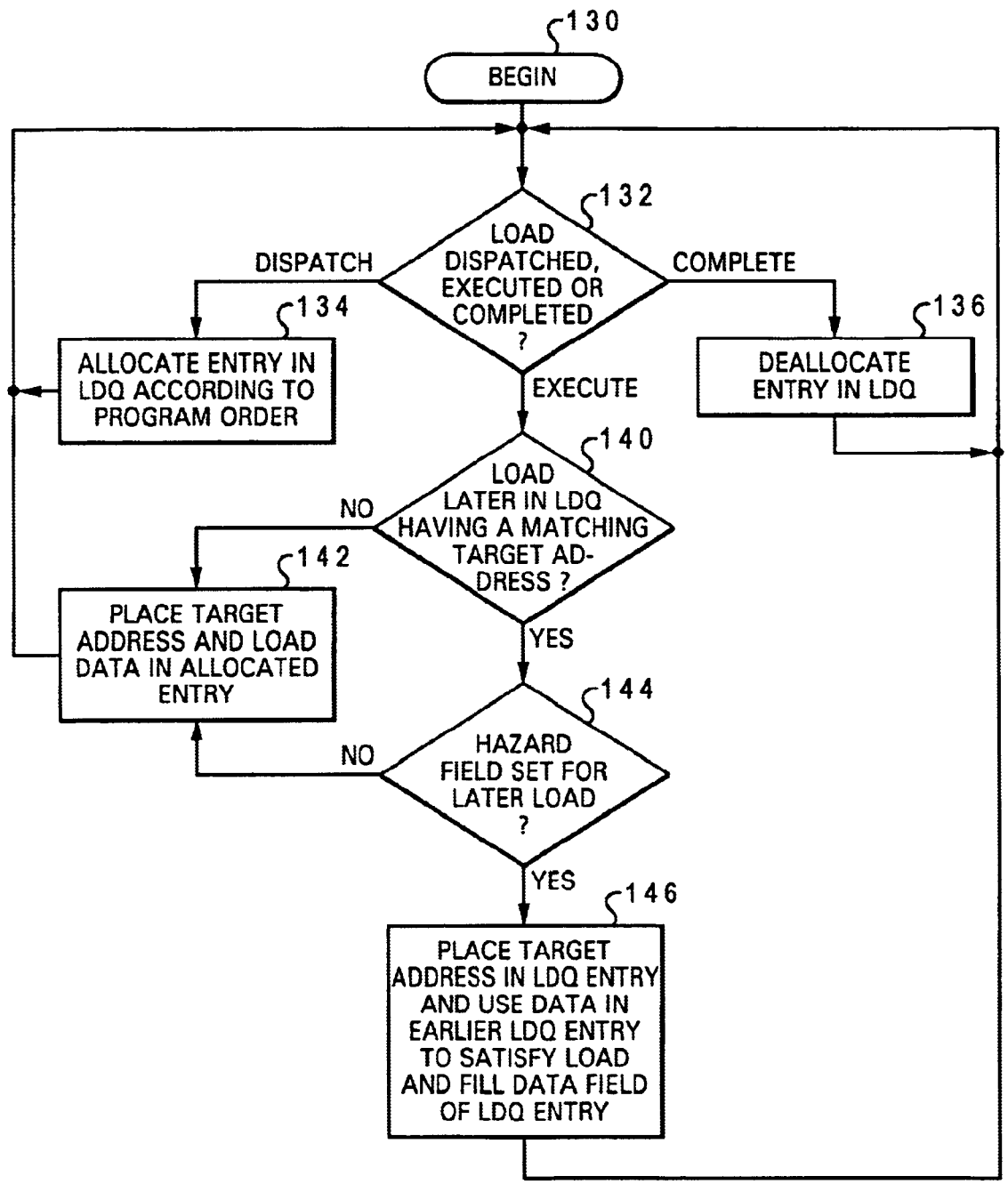
FIG. 3A is a high level logical flowchart of an exemplary method by which the queue management logic shown in FIG. 2 updates the LDQ in response to various stages in the processing of local load operations.

With reference now to FIG. 3A, there is illustrated a high level logical flowchart of an exemplary method by which queue management logic 128 of FIG. 2 manages LDQ 114 in response to various stages in the local processing of load operations. As shown, the process begins at block 130 and then proceeds to block 132 in response to queue management logic 128 receiving a notification that a load instruction has been processed at some stage of the execution pipeline between dispatch and completion. In response to this notification, queue management logic 128 determines at block 132 whether the load instruction has been dispatched, executed or completed by processor 10. In response to a determination that the load instruction has been dispatched from ITU 42 to one of latches 46 and 48, as described above, the process proceeds to block 134. Block 134 depicts queue management logic 126 allocating an entry in LDQ 114 for the newly dispatched instruction in accordance with the program order of the load instruction and placing the EA of the instruction within EA field 120. Thus, the location of an entry of a load instruction within LDQ 114 preferably indicates the program ordering of the load instruction with respect to other load instructions. Thereafter, the process returns to block 132.

Returning to block 132, in response to a determination that a load instruction has been completed (together with other instructions in its instruction group) by GCT 38, queue management logic 126 deallocates the entry corresponding to the completed load instruction, for example, by identifying an entry having a matching EA. Thereafter, the process returns to block 132.

If, on the other hand, queue management logic 128 determines from the received notification at block 132 that a load instruction has been executed by one of LSUs 96 and 98, the process proceeds to block 140, which illustrates queue management logic 128 determining whether a later entry in LDQ 114 than the entry allocated to the executed load instruction has a target address in its target address field 122 that matches the target address of the executed load instruction.

If not, queue management logic 128 places the target address of the executed load instruction in the target address field 122 of the associated entry and places the data retrieved from memory (i.e., local cache, remote cache, or system memory 12) in response to execution of the load instruction in data field 124 of the associated entry, as shown at block 142. The entry associated with the executed load instruction is also updated, as depicted at block 142, even if an entry associated with a later load instruction has a matching address if a determination is made at block 144 that hazard field 126 of the matching entry is not set. However, if hazard field 126 of the matching entry is set, a data hazard is detected.

As illustrated at block 146, to correct for the data hazard, queue management logic 128 places the target address for the executed load instruction in target address field 122 of the associated entry and utilizes the data contained in data field 124 of the matching entry of the later-in-program-order load to provide the data requested by the executed load instruction. That is, the data from data field 124 of the matching entry is provided to one of GPRs 84 and 86 as specified by the executed load instruction and is also placed into data field 24 of the entry in LDQ 114 associated with the executed load instruction. Thus, the operation of queue management logic 128 minimizes the performance penalty associated with data hazards since the earlier-in-program-order load instruction need not be re-executed to obtain the correct data (i.e., in this case, the same data as the later-in-program-order load) and no flush of instructions is required. Following block 146, the process returns to block 132.

Figure 3B:
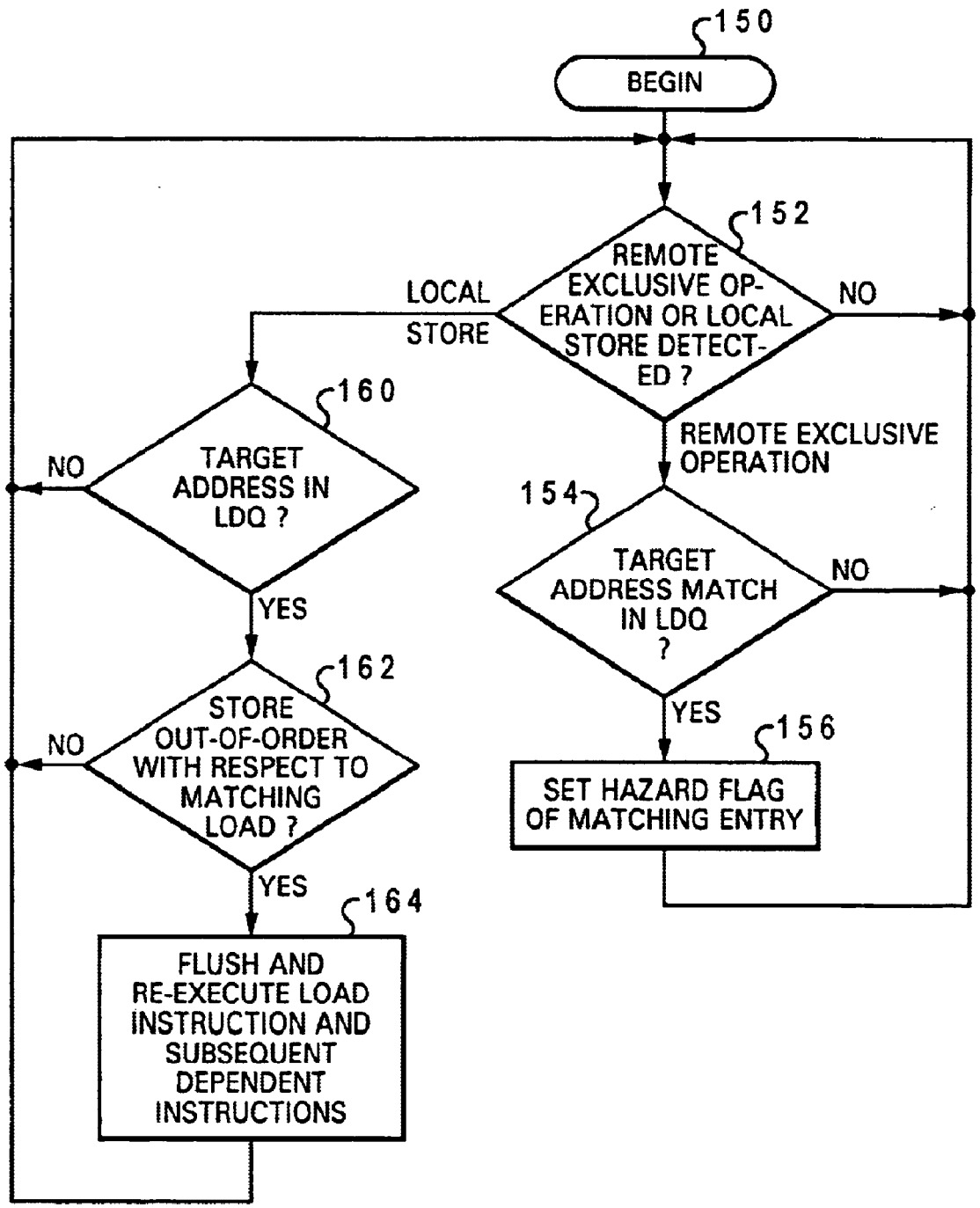
FIG. 3B is a high level logical flowchart of an exemplary method by which the queue management logic of FIG. 2 manages the LDQ in response to detection of local store operations and remote exclusive operations.

Referring now to FIG. 3B, there is depicted a high level logical flowchart of an exemplary method by which queue management logic 128 of FIG. 2 updates hazard fields 126 of LDQ 114 in response to detection of remote exclusive operations and corrects data hazards occasioned by the execution of local store operations. As depicted, the process begins at block 150 and then iterates at block 152 until notification is received of a locally executed store instruction or of an exclusive access (e.g., read-with-intent-to-modify, flush or kill) request on interconnect fabric 14 made by a remote processor 10. In response to receipt of notification of local execution of a store instruction, the process passes to block 160, which is described below. However, in response to notification of an exclusive access request by a remote processor 10, the process proceeds from block 152 to block 154, which illustrates queue management logic 128 determining whether or not a target address specified by the remote exclusive access request matches the target address contained in target address field 122 of any entry within LDQ 114. If not, the process simply returns to block 152, which has been described.

However, in response to a determination that the target address of the remote exclusive address request matches the address contained in the target address field 122 of an entry in LDQ 114, queue management logic 128 sets hazard field 126 of the matching entry, as shown at block 156, to indicate the existence of a possible remotely-triggered data hazard for any earlier-in-program-order load instruction executed after the load instruction associated with matching entry. The existence of an actual data hazard is detected at blocks 140 and 144 of FIG. 3A for remote exclusive operations and at blocks 160–164 of FIG. 3B for local store operations. Following block 156, the process illustrated in FIG. 3B returns to block 152.

Referring again to block 152, in response to queue management logic 128 receiving notification of execution of a local store instruction, queue management logic 128 determines at blocks 160 and 162 whether or not the target address of the store instruction matches a target address of an later-in-program-order but earlier executed load instruction in one of target address fields 122 of LDQ 14. If not, the process simply returns to block 152, which has been described. However, in response to a determination that the target address of the store instruction matches a target address of an later-in-program-order but earlier executed load instruction, queue management logic 128 determines that a data hazard has occurred and corrects the data hazard by flushing at least the matching load instruction and any subsequent dependent instructions and by causing these instructions to be re-executed. Queue management logic 128 also deallocates the entry in LDQ 114 allocated to the flushed load.

Figure 4A:
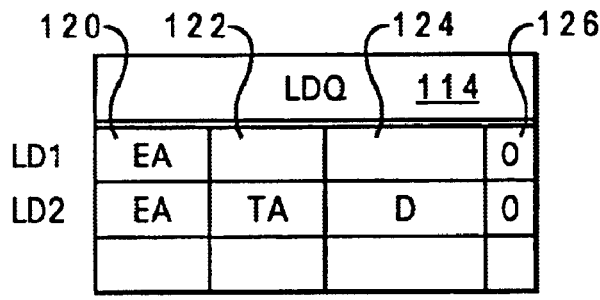
FIGS. 4A–4C are three views of LDQ 114 that together illustrate an exemplary operating scenario in which a data hazard caused by a remote exclusive operation is detected and corrected in accordance with the present invention.
Figure 4B:
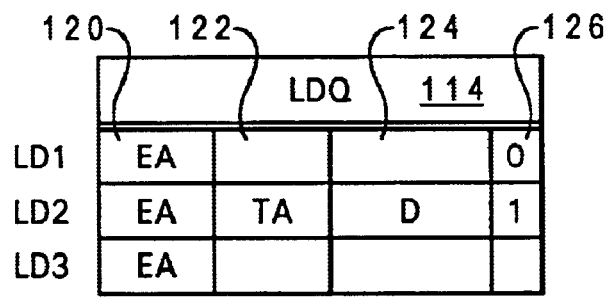
Figure 4C:
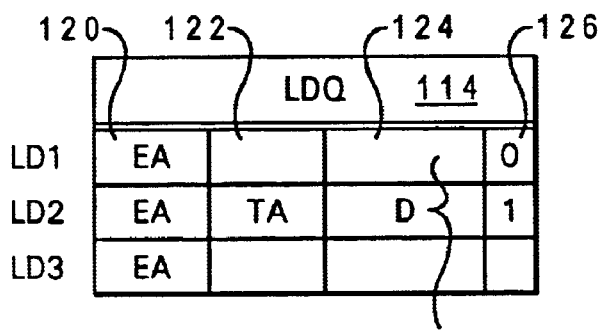

With reference now to FIGS. 4A–4C, there are illustrated three block diagrams that together illustrate an exemplary operating scenario in which a data hazard caused by a remote exclusive operation is detected and corrected in accordance with the present invention. Referring first to FIG. 4A, when the operating scenario begins, two load instructions, which are designated LD1 and LD2 in program order (with LD2 being the latest in program order), have been dispatched and accordingly have been allocated entries in LDQ 14 by queue management logic 128. In addition, LD2 has been executed out-of-order with respect to LD1, and the target address (TA) and data (D) have been loaded into the appropriate entry of LDQ 114 by queue management logic 128. The hazard field 128 of the entry associated with each of the load instructions is reset to 0.

Next, as shown in FIG. 4B, in response to queue management logic 128 receiving notification of a remote request for exclusive access having a target address that matches the TA of LD2, hazard filed 126 of the entry associated with LD2 is set to 1. Then, as indicated in FIG. 4C, when LD1 is executed out-of-order and the execution generates a target address matching the TA specified in target address field 124 of the entry associated with LD2, a data hazard is detected. Accordingly, queue management logic 128 provides the data from data field 124 of the entry corresponding to LD2 to the register file to satisfy LD1 and also records the data in data field 124 and records the target address in target address field 122 of the entry corresponding to LD1. Thus, a data hazard caused by a remote exclusive operation intervening between out-of-order executed loads is detected and correctly without flushing or re-executing any instructions and without any additional latency.

As has been described, the present invention provides an improved processor and method that reduces the performance penalty associated with data hazards by recording the data associated with out-of-order load instructions in a load data queue and then, in response to detection of a data hazard, utilizing that data to satisfy an earlier-in-program-order load instruction.

While the invention has been particularly shown and described with reference to a preferred embodiment, it will be understood by those skilled in the art that various changes in form and detail may be made therein without departing from the spirit and scope of the invention.

What is claimed is:

1. A processor, comprising:
   a register set;
   at least one execution unit that executes load instructions to transfer data from a memory into said register set;
   a load queue containing at least one entry, wherein said entry stores load data retrieved by a first load instruction; and
   queue management logic that, responsive to execution of a second load instruction, detects by reference to said load queue whether a data hazard exists, and if so, outputs said load data retrieved by said first load instruction from said entry to said register set in accordance with said second load instruction, wherein said queue management logic, responsive to detection of said data hazard, initiates reexecution of at least said first load instruction but not said second load instruction.

2. The processor of claim 1, wherein said entry stores a target address of said first load instruction and has a hazard flag indicative of a possible data hazard, wherein said queue management logic detects that a data hazard exists if said second load instruction precedes said first instruction in program order and a target address of said second load instruction matches said target address stored in said entry and said hazard flag is set.

3. The processor of claim 2, wherein said queue management logic sets said hazard flag at least in response to local store operation specifying said target address.

4. The process of claim 1, said register set comprising a general purpose register set.

5. The processor of claim 1, wherein said queue management logic outputs said load data from said load queue to a register in said register set that is specified by said second load instruction.

6. The processor of claim 1, wherein said queue management logic allocates a respective entry within said load queue to each load instruction upon dispatch and, upon completion of said each load instruction, deallocates said respective entry.

7. A data processing system, comprising:
   an interconnect fabric;
   a memory coupled to said interconnect fabric;
   a register set;
   at least one execution unit that executes load instructions to transfer data from said memory into said register set;

a load queue containing at least one entry, wherein said entry stores load data retrieved by a first load instruction; and queue management logic that, responsive to execution of a second load instruction, detects by reference to said load queue whether a data hazard exists, and if so, outputs said load data retrieved by said first load instruction from said entry to said register set in accordance with said second load instruction, wherein said queue management logic, responsive to detection of said data hazard, initiates reexecution of at least said first load instruction but not said second load instruction.

8. The data processing system of claim 7, wherein said entry stores a target address of said first load instruction and has a hazard flag indicative of a possible data hazard, wherein said queue management logic detects that a data hazard exists if said second load instruction precedes said first instruction in program order and a target address of said second load instruction matches said target address stored in said entry and said hazard flag is set.

9. The data processing system of claim 8, wherein said queue management logic sets said hazard flag at least in response to local store operation specifying said target address, wherein said local store instruction is earlier in program order but later executed than said first load instruction.

10. The data processing system of claim 9, wherein said at least one execution unit, said register set and said load queue comprise a first processor and said data processing system includes a second processor, wherein said queue management logic also sets said hazard flag in response to said second processor issuing an exclusive access operation specifying said target address on said interconnect fabric.

11. The data processing system of claim 7, said register set comprising a general purpose register set.

12. The data processing system of claim 7, wherein said queue management logic outputs said load data from said load queue to a register in said register set that is specified by said second load instruction.

13. The data processing system of claim 7, wherein said queue management logic allocates a respective entry within said load queue to each load instruction upon dispatch and, upon completion of said each load instruction, deallocates said respective entry.

14. A method of executing load instructions out-of-order in a processor having a register set and a load queue, said method comprising:

storing, in an entry in said load queue, load data retrieved from memory in response to executing a first load instruction;

in response to execution of a second load instruction, detecting by reference to said load queue whether a data hazard exists; and in response to detection of a data hazard, outputting said load data retrieved by said first load instruction from said entry to said register set in accordance with said second load instruction, wherein in response to dectection of said data hazard, initiating reexecution of at least said first load instruction but not said second load instruction.

15. The method of claim 14, wherein said entry stores a target address of said first load instruction and has a hazard flag indicative of a possible data hazard, wherein detecting that a data hazard exists comprises determining if said second load instruction precedes said first instruction in program order and a target address of said second load instruction matches said target address stored in said entry and said hazard flag is set.

16. The method of claim 15, and further comprising setting said hazard flag at least in response to a local store operation specifying said target address, wherein said local store instruction is earlier in program order but later executed than said first load instruction.

17. The method of claim 15, wherein outputting said load data comprises outputting said load data from the load queue to a register in said register set that is specified by said second load instruction.

18. The method of claim 15, and further comprising allocating a respective entry within said load queue to each load instruction upon dispatch and, upon completion of said each load instruction, deallocating said respective entry.

* * * * *